United States Patent
Okuda et al.

[11] Patent Number: 5,898,870
[45] Date of Patent: Apr. 27, 1999

[54] LOAD BALANCING FOR A PARALLEL COMPUTER SYSTEM BY EMPLOYING RESOURCE UTILIZATION TARGET VALUES AND STATES

[75] Inventors: Tooru Okuda, Fujisawa; Yoshiyuki Iwakura, Yokohama; Hirofumi Nagasuka, Kawasaki, all of Japan

[73] Assignee: Hitachi, Ltd., Tokyo, Japan

[21] Appl. No.: 08/766,853

[22] Filed: Dec. 13, 1996

[30] Foreign Application Priority Data

Dec. 18, 1995 [JP] Japan ................................. 7-328442

[51] Int. Cl.⁶ ................................................ G06F 15/00
[52] U.S. Cl. ......................................... 395/674; 395/675
[58] Field of Search ................................... 395/674, 675

[56] References Cited

U.S. PATENT DOCUMENTS

| | | | |
|---|---|---|---|
| 4,099,235 | 7/1978 | Hoschler et al. | 364/200 |
| 5,307,496 | 4/1994 | Ichinose et al. | 395/650 |
| 5,475,844 | 12/1995 | Shiramizu et al. | 395/700 |
| 5,630,129 | 5/1997 | Wheat | 395/675 |

*Primary Examiner*—Lance Leonard Barry
*Attorney, Agent, or Firm*—Antonelli, Terry, Stout & Kraus, LLP

[57] ABSTRACT

A load sharing method for a parallel computer system having a computer group including a plurality of computers and an operation management mechanism which is a computer for managing the operation of the computer group. The method shares a load for executing a plurality of kinds of work processes to the plurality of computers in the computer group, and includes the steps of setting resource utilization target values by work for the plurality of computers in the computer group; collecting resource utilization states by work for the plurality of computers in the computer group to thereby inform the operation management mechanism of the resource utilization states; selecting a computer to execute a newly requested work process from the plurality of computers in the computer group on the basis of the differences between resource utilization target parameter values by work in the plurality of computers in the computer group and current values of a parameter indicating the reporting resource utilization states by work; and executing, in the selected computer, the newly requested work process

11 Claims, 5 Drawing Sheets

WORK A

|  | CPU UTILIZATION | MS EMPTY RATIO | PAGING RATIO | ... |
|---|---|---|---|---|
| SYSTEM 1 | 80 | 60 | 70 |  |
| SYSTEM 2 | 75 | 35 | 50 |  |
| SYSTEM 3 | 20 | 20 | 30 |  |

~5

WORK B

|  | CPU UTILIZATION | MS EMPTY RATIO | PAGING RATIO | ... |
|---|---|---|---|---|
| SYSTEM 1 | 10 | 10 | 80 |  |
| SYSTEM 2 | 5 | 50 | 65 |  |
| SYSTEM 3 | 25 | 75 | 30 |  |

~6

WORK C

|  | CPU UTILIZATION | MS EMPTY RATIO | PAGING RATIO | ... |
|---|---|---|---|---|
| SYSTEM 1 | 45 | 100 | 0 |  |
| SYSTEM 2 | 45 | 80 | 0 |  |
| SYSTEM 3 | 45 | 0 | 0 |  |

| LOAD SHARING GROUP | PROCESS | |
|---|---|---|
| | | ~40 |
| GROUP 1 | BATCH JOB PROCESS A, B | ~41 |
| GROUP 2 | ONLINE PROCESS | ~42 |
| GROUP 3 | TSS PROCESS | ~43 |

FIG. 5

```
WLG 1    ONLINE ~51
WLG 2    BATCH  ~52
WLG 3    TSS    ~53       %           %
WLR      SYSID = 1, WLG 1 = 20, WLG 2 = 80  ~54
WLR      SYSID = 2, WLG 1 = 10, WLG 2 = 60, WLG 3 = 20
WLR      SYSID = 3, WLR 1 = 50, WLG 3 = 50
                                              ~56   55
```

LOAD BALANCING FOR A PARALLEL COMPUTER SYSTEM BY EMPLOYING RESOURCE UTILIZATION TARGET VALUES AND STATES

BACKGROUND OF THE INVENTION

The present invention relates to a load sharing control method for controlling load sharing in a parallel computer system, and particularly to an effective technique to be applied to a load sharing control method for sharing a multiple of kinds of jobs or sessions among a plurality of computers in a parallel computer system with good balance to improve processing speed and guarantee of the turn-around time of jobs.

As main jobs or sessions executed in a conventional computer system, there are jobs or sessions performed by batch process, online process and TSS (timesharing system) process. The jobs, sessions or transactions are hereinafter referred to as "works". In order to operate these works efficiently in one computer system, the order of priority for execution of the works is set by parameters On the other hand, the idea of executing a plurality of works in a parallel computer system having a plurality of computers connected in parallel has been proposed to increase the amount of works to be executed. Upon such a background, some methods or apparatuses have been proposed as load sharing control methods or load sharing control apparatuses each used in a parallel computer system for sharing a load among a plurality of computers executing a plurality of works.

JP-A-3-19035 discloses a job execution multiplicity control system in which the job execution multiplicity of a job execution queue as a whole is adjusted to attain increased speed of a batch job while the computer system is in operation.

In brief, the job execution multiplicity control system comprises a number-of-jobs recognition means for recognizing the number of currently running jobs from the job execution queue as a whole, a job execution multiplicity recognition means for making the computer system recognize designated job execution multiplicity, and a job control means for controlling job extraction.

JP-A-5-197682 discloses an online job dynamic load control system in which the lowering of online response can be prevented effectively even in the case where dynamic load in online transaction increases.

In brief, the dynamic load control system comprises a load state recognition means for measuring load on a central computer at predetermined timing to recognize the state of load, and a starting control means for changing/controlling the processing multiplicity of sessions to be executed only when the measured value of load exceeds a predetermined value.

Further, JP-A-3-257654 discloses a load sharing system using session multiplicity in which sessions re assigned to processors in a range of session largest multiplicity to thereby reduce an overhead of a load sharing process per se to improve efficiency of a computer system as a whole.

In brief, when the number of currently operating sessions on a multiplicity information table for storing the session largest multiplicity and the number of currently operating sessions correspondingly to the respective processors does not exceed the largest multiplicity, a session requested to be started is assigned to and started by one of the processors which is determined correspondingly to the session largest multiplicity Further, JP-A-6-19861 (U.S. Pat. No. 5,504,894) discloses a transaction processing server path setting mechanism in which response time of online transaction is set by a user by the job class so that the transaction is shared to achieve the response time.

In brief, in a multiprocessor transaction processing system, a transaction is classified into a plurality of classes in accordance with the processing time required therefor, target response time is set by the class and load on each transaction processing server is adjusted so that response performance becomes best in relation between the target response time and actual processing time with respect to all the classes.

As a result of study of the aforementioned prior art references, the present inventors have found the following problems.

That is, in the load sharing control method disclosed in the first-mentioned prior art reference, the load sharing control method is carried out in only one utilization mode in which one kind of works are executed. Accordingly, there is a problem that load sharing adapted to other utilization modes in which a plurality of kinds of works are executed by batch process, online process, TSS process, etc. cannot be carried out.

Further, in the load sharing control method according to the aforementioned prior art, in order to make it possible to share load in accordance with the utilization mode for executing a plurality of kinds of works, load sharing in accordance with an operation mode is carried out in a manner so that the number of initiators (the number of sessions), which indicates multiplicity and which is defined in each sub-system for executing a specific one kind of works is set so as to be different from the number of initiators in another sub-system It is however required that a plurality of sub-systems for executing a specific kind of work processes are required to take charge of other kinds of works correspondingly to the characteristic thereof to hereby attain the increase in processing speed.

SUMMARY OF THE INVENTION

An object of the present invention is to provide a load sharing control method and apparatus in which the load for a plurality of kinds of works can be assigned to a plurality of computers constituting a computer group in accordance with the utilization modes.

Another object of the present invention is to provide a load sharing control technique in which the load can be shared among a plurality of computers constituting a computer group correspondingly to the respective characteristics of kinds of works.

A further object of the present invention is to provide a load sharing control technique in which the load can be shared uniformly when the load for a plurality of kinds of works is assigned to a plurality of computers constituting a computer group.

Typical aspects of the present invention disclosed in this specification will be described below in brief.

According to a first aspect of the present invention, in a parallel computer system having a computer group constituted by a plurality of computers, and an operation management mechanism which is a computer for managing the operation of the computer group, a load sharing control method for sharing load for executing a plurality of kinds of work processes to the plurality of computers in the computer group, comprises the steps of: setting resource utilization target values by work for the plurality of computers constituting the computer group; collecting resource utilization states by work for the plurality of computers constituting the computer group to thereby inform the operation management mechanism of the resource utilization states; selecting a computer to execute a newly requested work process from the plurality of computers in the computer group on the basis of the differences between resource utilization target parameter values by work in the plurality of computers constituting the computer group and current values of a parameter indicating the reported resource utilization states by work; and executing, in the selected computer, the work process newly requested to be started In the above load sharing control method, first, resource utilization target values by work in respective computers constituting a computer group are set in advance in the operation management mechanism by using parameter definitions, or the like.

Then, the plurality of computers constituting the computer group collect resource utilization states by work in the respective computers and inform the operation management mechanism of the collected individual resource utilization states by work.

The operation management mechanism has a resource utilization-state management table which is prepared in the initialization of the system. Resource utilization states by work informed from the plurality of computers constituting the computer group are arranged on the resource utilization-state management table, so that the respective computers recognize the resource utilization states of the plurality of computers constituting the computer group by referring to the resource utilization-state management table.

In response to a starting request by any computer to newly start a work process in the parallel computer system having the operation management mechanism and the computer group constituted by the plurality of computers, the request issuing computer constituting the computer group compares the resource utilization target value of each work (process) work with the resource utilization state thereof on the resource utilization-state management table for each of the group computers. Thus, one of the computers which is to execute a newly requested work process is selected from the plurality of computers constituting the computer group on the basis of the result of the comparison.

Each computer communicates with the selected computer and instructs the selected computer to execute the work process newly requested to be started. Thus, the selected computer executes the newly requested work process.

In the above load sharing control method, in this manner, the operation mode of the parallel computer system as a whole can be defined by setting in advance resource utilization target values by work, so that load sharing can be achieved in accordance with the operation mode which is defined in advance.

Further, in the above load sharing control method, turn-around time can be guaranteed at the time of execution of a work process corresponding to the utilization target value in a manner so that resources corresponding to the preliminarily designated resource utilization target value is made free in advance.

According to a second aspect of the present invention, in the load sharing control method according to the first aspect of the present invention, the parameter indicating the resource utilization states by work of the plurality of computers constituting the computer group informed from the plurality of computers constituting the computer group to the operation management mechanism contains at least one of CPU utilization ratio information of each of the computers constituting the computer group, CPU utilization ratio information weighted by difference in performance of the plurality of computers constituting the computer group, and main storage free-state information in the plurality of computers constituting the computer group.

In the above load sharing control method, the respective computers constituting the computer group collect the CPU utilization ratio which is the proportion of the processing time per unit time of the central processing units in the respective computers constituting the computer group, the CPU utilization ratio which is weighted by differences in performance of the respective computers constituting the computer group, or the main storage free-state which is the proportion of the number of free pages in the main storage devices of the respective computers constituting the computer group, as the resource utilization states of the plurality of computers constituting the computer group to be informed to the operation management mechanism Here, the CPU utilization ratio, which is weighted by differences in capability of the respective computers constituting the computer group, means the relative CPU utilization ratio which is given when the processing performance capability (e.g. expressed by "FLOPS") of a computer lowest in processing (capability) among the plurality of computers constituting the computer group is assumed to be '1'.

In the parallel computer system having the operation management mechanism and the computer group constituted by the plurality of computers, the works requested to be started include works having various characteristics, such as works very high in load on the central processing unit, works requiring large main storage areas, and so on.

Therefore, in the above load sharing control method, each of the computers constituting the computer group collects the information concerning the utilization states of a plurality of kinds of resources as the resource utilization states of the respective computers constituting the computer group, so that load sharing is performed correspondingly to the collected resource utilization states.

As described above, according to the above load sharing control method, because the utilization states of a plurality of kinds of resources which are actually used in the plurality of computers constituting the computer group are collected so that a newly requested work process is executed by one of the computers selected in accordance with a specific resource utilization state, the load can be shared among the plurality of computers constituting the computer group correspondingly to the respective characteristics of the plurality of kinds of works.

In the load sharing control method according to the first or second aspect of the present invention, the step of selecting a computer to execute a newly requested work process includes a substep of calculating a difference between a resource utilization target parameter value by work in each of the computers constituting the computer group and the informed resource utilization state parameter by work to thereby select a computer in which the difference is largest.

In the parallel computer system having the operation management mechanism and the computer group constituted by the plurality of computers, when a request to start a work process is newly given and a computer which executes the work process is to be selected, if one of the computers which is small in difference between the resource utilization target value by work in each of the computers constituting the computer group and the informed resource utilization state by work is selected to make the selected computer execute the work process, the load on the selected computer may be increased so that the completion of the processing may be delayed.

In the above load sharing control method, therefore, when a computer which is to execute a work process newly requested to be started is selected, the resource utilization target values by work in the respective computers constituting the computer group are compared with the reported resource utilization states by work so that one of the computers largest in difference is selected from the result of the comparison so as to execute the work process newly requested to be started Accordingly, when load for a plurality of kinds of works is shared to a plurality of computers constituting a computer group, the load can be shared uniformly.

Other objects, features and advantages of the invention will become apparent when reading the following detailed description of the embodiments of the invention in conjunction with the accompanying drawings

BRIEF DESCRIPTION OF THE DRAWINGS

FIG. 4 is a view showing an example of the load sharing grouping table in the load sharing control method according to the embodiment of the present invention;

FIG. 5 is a view showing an example of the parameter definition for defining resource utilization target values in the load sharing control method according to the embodiment of the present invention;

DESCRIPTION OF THE PREFERRED EMBODIMENTS

An embodiment of the present invention will be described below in detail with reference to the accompanying drawings. In all the drawings for explaining the embodiment, parts having the same as or equivalent to each other are referenced correspondingly and the repetition of description is omitted.

A load sharing control method according to the present invention will be described below on the basis of an embodiment in which resources are assigned in accordance with the utilization target values of resources to be utilized in respective works.

Figure 1:
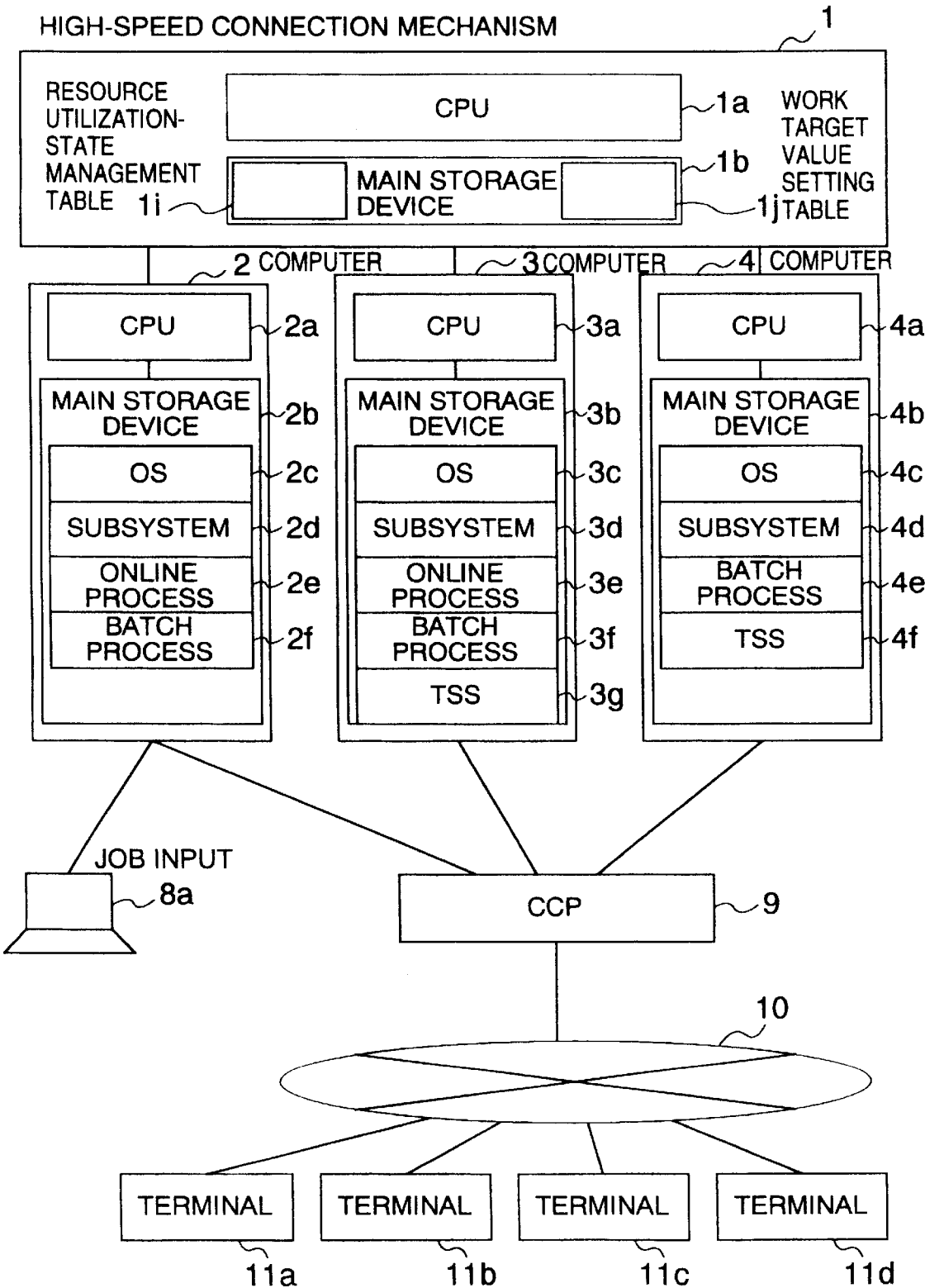
FIG. 1 is a diagram showing the schematic configuration of a parallel computer system in a load sharing control method according to an embodiment of the present invention.

FIG. 1 shows the schematic configuration of a parallel computer system in a load sharing control method according to the embodiment. In FIG. 1, the reference numeral 1 designates a high-speed connection mechanism serving as an operation manager; 2 to 4, computers; 1a, 2a, 3a and 4a, central processing units; 1b, 2b, 3b and 4b, main storage devices (MS); 2c, 3c and 4c, operating systems; 2d, 3d and 4d, sub-systems; 2e and 3e, online processes; 2f, 3f and 4e, batch processes; 3g and 4f, TSS processes; 8a, a job input console; 9, a communication control processor (CCP) for controlling communication among the computers; 10, a communication network (such as LAN, WAN, etc.); and 11a to 11d, terminals which can be connected to the parallel computers through the network 10. Job input consoles 8a may be further provided in the computers 3 and 4 or may be provided in the terminals 11a to 11d.

Figures 2, 3:
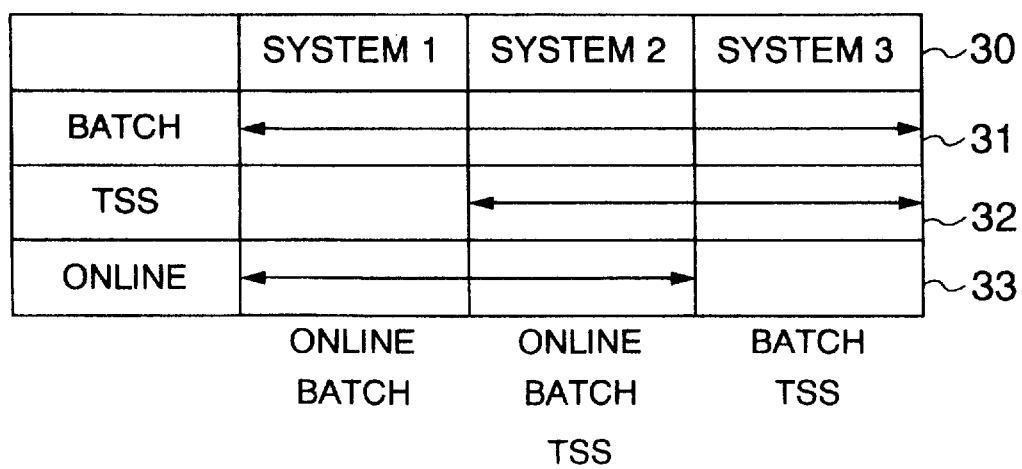
FIG. 2 is a view showing an example of the resource utilization-state management table by work in the load sharing control method according to the embodiment of the present invention.
FIG. 3 is a view showing an example of the operation mode table in the load sharing control method according to the embodiment of the present invention.

As shown in FIG. 1, the parallel computer system in the load sharing control method according to the present embodiment comprises a high-speed connection mechanism 1, computers 2 to 4, central processing units 1a, 2a, 3a and 4a, main storage devices 1b, 2b, 3b and 4b, operating systems 2c, 3c and 4c, sub-systems 2d, 3d and 4d, online processes 2e and 3e, batch processes 2f, 3f and 4f, and TSS processes 3g and 4g. Each of the computers includes a scheduler for making a query to the operating system (OS) of the other computer, adjustment, etc. The main storage device 1b of the high-speed connection mechanism 1 has resource utilization-state management tables 1i (FIG. 2) and work target value setting table 1j (FIG. 2). Although this embodiment shows the case where the number of computers constituting a group of computers is three, it is a matter of course that the invention is not limited thereto and that any desired number of computers may be provided.

In the parallel computer system, a plurality of computers 2 to 4 constituting a group of computers are connected to the high-speed connection mechanism 1 which is a computer for managing the operations of the set of computers. The high-speed connection mechanism 1 and the computers 2 to 4 include central processing units 1a, 2a, 3a and 4a, and main storage devices 1b, 2b, 3b and 4b, respectively, so that operating systems (OS) 2c, 3c and 4c operate in the respective computers 2 to 4. Each of the computers monitors its own load state by referring to both the resource utilization-state management table and the work target value setting table from the high-speed connection mechanism and operates to make interaction about shared load through the CCP 9 on the basis of the result of the monitoring.

Among the computers 2 to 4 in the parallel computer system for carrying out the load sharing control method according to the present embodiment, a corresponding computer, in which its own scheduler for determining the computer to execute a work requested to be started operates, makes reference to the high-speed connection mechanism which stores therein the resource utilization-state management table 1i indicating the current utilization states of resources by work for the other computers and the work target value setting table 1j indicating the utilization target values of resources by work for the other computers.

In the computers 2 to 4 constituting the computer group in the parallel computer system for carrying out the load sharing control system according to the present embodiment, the sub-systems 2d, 3d and 4d for executing specific work processes respectively operate so that a set of the online process 2e and the batch process 2f, a set of the online process 3e, the batch process 3f and the TSS process 3g and a set of the batch process 4e and the TSS process 4f are executed in the sub-systems respectively in the form of load sharing.

FIG. 2 shows an example of resource utilization-state management tables by work in the load sharing control method according to the present embodiment. As shown in FIG. 2, the resource utilization-state management tables 1i by work in the load sharing control method according to the embodiment are constituted by a resource utilization-state management table 5 for work A, a resource utilization-state management table 6 for work B, and a resource utilization-state management table 7 for work C.

Further, as shown in FIG. 2, in the resource utilization-state management tables by work in the load sharing control method according to the present embodiment, systems 1 to 3 on each of the resource utilization-state management tables 5 to 7 correspond to the respective computers 2 to 4, shown in FIG. 1, so that the resource utilization-state management tables 5 to 7 are generated by work or by group which will be described later.

The resource utilization-state management tables 5 to 7 in the load sharing control method according to the present embodiment store CPU utilization ratios which are processing periods per unit time of the central processing units 2a to 4a of the computers 2 to 4 in the case where works A to C are executed by the computers 2 to 4, main storage (MS) free ratios which are the proportions of free pages in the main storage devices 2b to 4b, and paging ratios indicating the proportions of the number of times of paging.

The central processing units 2a, 3a and 4a of the computers 2 to 4 constituting the group of computers in the parallel computer system for carrying out the load sharing control method according to the present embodiment have the same processing performance. When the group of computers are constituted respectively by computers having central processing units which are different in terms of processing performance, however, relative CPU utilization ratios may be used so that the processing performance of the computer having the lowest processing performance is regarded as '1'.

FIG. 3 shows an example of an operation mode table in the load sharing control method according to the present embodiment. In FIG. 3, the reference numeral 30 designates an operation mode table; and 31 to 33, operating processes corresponding to the respective systems 1 to 3.

As shown in FIG. 3, in the operation mode table in the load sharing control method according to the present embodiment, operation modes are formed from three kinds of work processes, namely, batch processes, online processes and TSS processes for the works 31 to 33. The system 1 corresponding to the computer 2 is assumed to be in an operation mode for executing a batch process and an online process. The system 2 corresponding to the computer 3 is assumed to be in an operation mode for executing all the processes, that is, a batch process, a TSS process and an online process. The system 3 corresponding to the computer 4 is assumed to be in an operation mode for executing a batch process and a TSS process.

FIG. 4 shows an example of a load sharing group definition table in the load sharing control method according to the present embodiment. In FIG. 4, the reference numeral 40 designates a load sharing group definition table; and 41 to 43, load sharing groups.

As shown in FIG. 4, the load sharing group definition table 40 in the load sharing control method according to the present embodiment has load sharing groups 41 to 43.

Further, as shown in FIG. 4, the load sharing group definition table in the load sharing control method according to the present embodiment indicates the definition of load sharing groups when a plurality of work processes are grouped so that the load sharing groups are made to be units for load sharing. The group 1 is assumed to be a load sharing group 41 assigned for batch job processes A and B. The group 2 is assumed to be a load sharing group 42 assigned for online processes. The group 3 is assumed to be a load sharing group 43 assigned for TSS processes. When the online processess contain different works, they are grouped into different groups such as an accounting system and an information system in a banking system FIG. 5 shows an example of a parameter definition table for defining utilization target values of resources in the load sharing control method according to the present embodiment. In FIG. 5, the reference numerals 51 to 56 designate various kinds of parameters As shown in FIG. 5, in the parameter definition table for defining utilization target values of resources in the load sharing control method according to the present embodiment, grouping work processes for setting utilization target values of resources is defined by WLG (Work Load Group) parameters 51 to 53 in which WLG1, WLG2 and WLG3 define online process, batch process and TSS process respectively. Setting of the utilization target values of resources of works grouped by the WLG parameters is performed on the basis of WLR (Work Load Rate) parameters 54 to 56 in which, for example, the value of an upper load limit of each group is designated and is expressed in terms of percents of its CPU utilization.

In the parameter definition in the load sharing control method according to the present embodiment, an online process group is defined by the parameter 51 'WLG1 ONLINE', a batch process group is defined by the parameter 52 'WLG2 BATCH', and a TSS process group is defined by the parameter 53 'WLG3 TSS'.

Further, in the WLR parameters for parameter definition in the load sharing control method according to the present embodiment, the utilization target values of resources in process groups corresponding to 'WLG1', 'WLG2' and 'WLG3' in each system identified by 'SYSID' are expressed in terms of percentages.

For example, in the case of the parameter definition in the load sharing control method according to the present embodiment, as represented by the parameter 54 in FIG. 5, the resource utilization target values of the process groups 'WLG1' and 'WLG2' in the system 1 identified by 'SYSID= 1', that is, the resource utilization target values of the online process group and the batch process groups are defined as '20%' and '80%' respectively The resource utilization target values in the case of parameter definition shown in FIG. 5 indicate the CPU utilization ratios of the respective computers. In the case of the parameter 54, the system 1 per se performs controlling so that online transaction is not given to the system 1 when the CPU utilization ratio indicating load on the online process is not smaller than '20%'.

Figure 6:
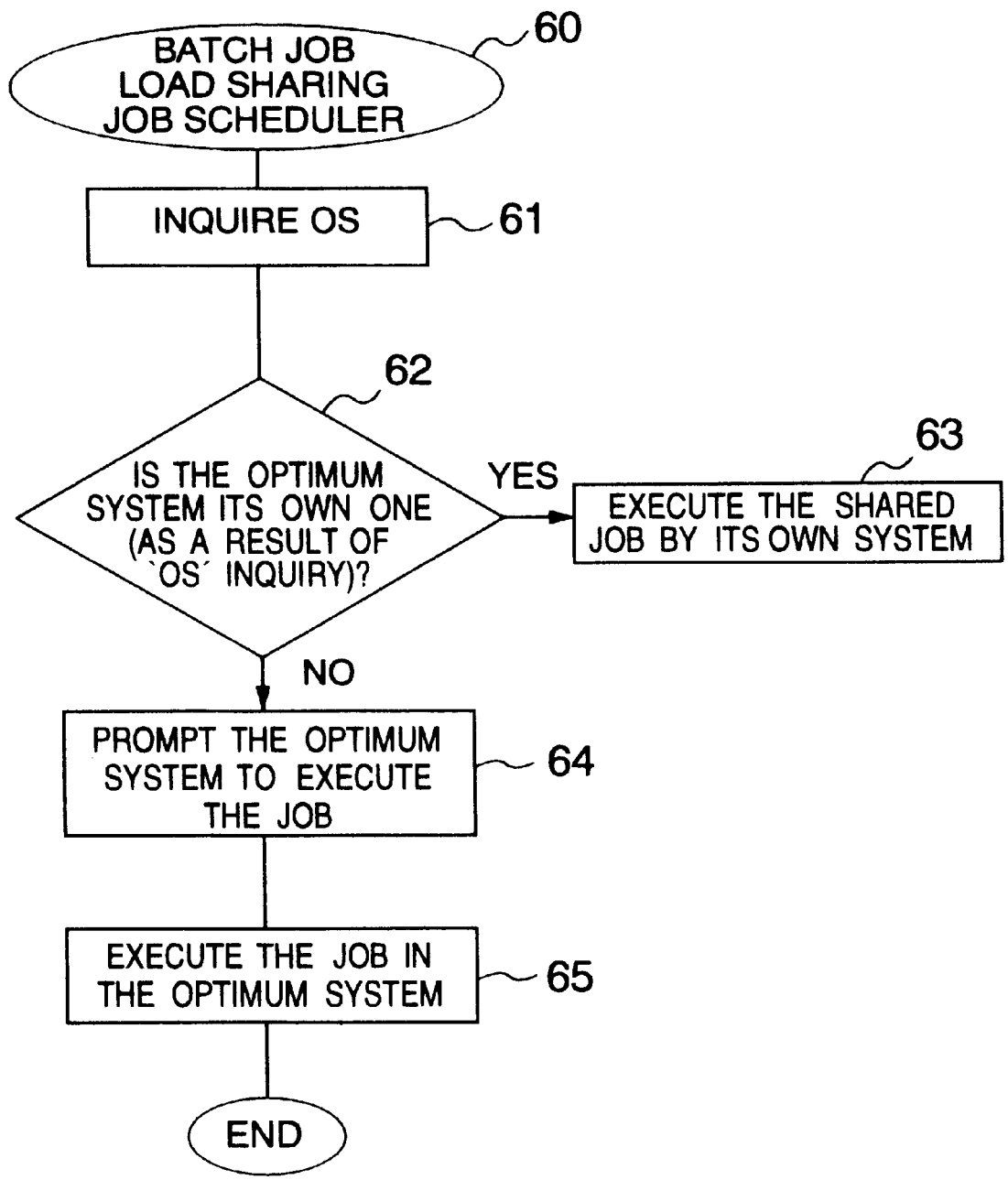
FIG. 6 is a flow chart showing a procedure of load sharing control in the load sharing control method according to the embodiment of the present invention.

FIG. 6 is a flow chart showing a procedure of load sharing control in the load sharing control method according to the present embodiment FIG. 6 shows an example of load sharing control in the load sharing control method according to the present embodiment. In a specific one of systems 1 to 3 corresponding to the computers, when a requested job is actually executed, the batch job load sharing job scheduler 60 for scheduling batch jobs to share load to the batch jobs issues a load sharing macro definition indicating inquiry of an OS supervisor (not shown) to its own OS (step 61). In the OS, the optimum system which is a destination of load sharing is determined by the OS supervisor (step 62). When the judgment proves that the optimum system is its own system, the shared job is executed by its own system (step 63). When the judgment proves that the optimum system is another one, the other system is prompted to execute the job (steps 64 and 65).

In the step 62, the OS supervisor examines the current resource utilization states of computers constituting the computer group on the basis of management information from the high-speed connection mechanism 1, selects the optimum computer system from the computers on the basis of the parameter definition and informs the batch job load sharing job scheduler of the selected system The batch job load sharing job scheduler informed by the OS supervisor operates either its own computer system or another computer system correspondingly to the information from the OS supervisor so that the job requested to be started is executed by the selected optimum system The load sharing control is performed in the same manner as above also when the load of jobs on other groups is shared. For example, in load sharing control in online transaction, an online program issues load sharing macro definition in the step 61 so that the optimum computer system for the online process is selected by the OS supervisor Further, the load sharing control is performed in the same manner as above also for load sharing control for the TSS process A TSS starting program issues load sharing macro definition in the step 61 and the macro definition is executed by the system designated by the OS supervisor in the step 62 to thereby achieve load sharing in accordance with the operation mode.

Figure 7:
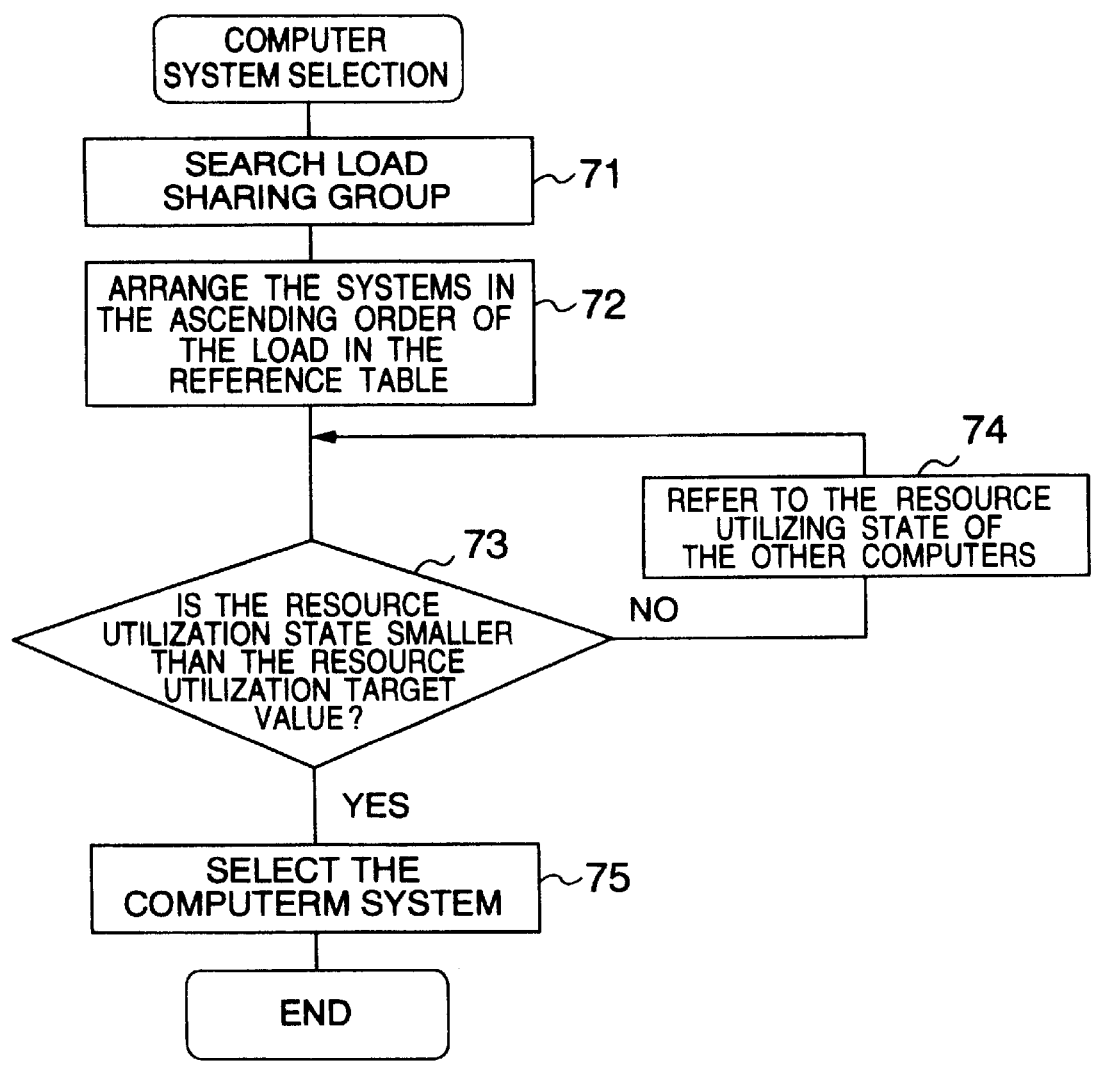
FIG. 7 is a flow chart showing a procedure of appropriate system selection based on the parameter definition in the load sharing control method according to the embodiment of the present invention.

FIG. 7 is a flow chart showing a procedure of the optimum system selection based on the parameter definition in the load sharing control method according to the present embodiment.

As shown in FIG. 7, in the optimum system selection based on the parameter definition in the load sharing control method according to the present embodiment, the system selection process per se is called out in a load sharing macro procedure, so that the load sharing group definition table 40 is first searched in step 71 to examine which load sharing group contains the job to be subjected to load sharing.

Then, in step 72, the resource utilization-state management table is examined about the systems 1 to 3 corresponding to the computers 2 to 4 constituting the computer group so that the systems are arranged in the order of ascending the resource utilization ratio of the system as a whole.

In step 73, the resource utilizing state of the load sharing group containing the job retrieved in the step 71 is compared with the resource utilization target value based on the parameter definition in a manner so that the comparison is performed upon the systems arranged in the step 72 in the order of ascending the resource utilization ratio of the system as a whole.

When the result of comparison between the resource utilizing state of the load sharing group containing the job and the resource utilization target value based on the parameter definition in the step 73 proves that the resource utilizing state of the load sharing group containing the job is not smaller than the resource utilization target value based on the parameter definition, the procedure goes to step 74 in which the resource utilizing state of the load sharing group containing the job for another system is compared with the resource utilization target value based on the parameter definition by referring to the resource utilizing state of the load sharing group containing the job for the other system so that the comparison is performed upon the systems arranged in step 72 in the ascending order of the resource utilization ratio of the system as a whole.

When the result of comparison between the resource utilizing state of the load sharing group containing the job and the resource utilization target value based on the parameter definition in the step 73 proves that there is some system in which the resource utilizing state of the load sharing group containing the job is smaller than the resource utilization target value based on the parameter definition, the procedure goes to step 75 in which a system in the resource utilization state smaller than the resource utilization target value based on the parameter definition is selected as a system for executing the job.

When the result of retrieval of the resource utilizing state of the load sharing group containing the job and the resource utilization target value based on the parameter definition with respect to the systems arranged in the step 72 in the ascending order of the resource utilization ratio of the system as a whole proves that there is no system in which the resource utilizing state of the load sharing group containing the job is smaller than the resource utilization target value based on the parameter definition, the lowest system in the resource utilization ratio as a whole is selected as a system for executing the job.

Although the present invention has been described above specifically on the basis of an embodiment, it is a matter of course that the invention is not limited to the embodiment and that various modifications or changes may be made without departing the gist of the invention.

What is claimed is:

1. In a parallel computer system having a computer group including a plurality of computers and an operation management mechanism which includes a computer for managing the operation of the computer group, a load sharing control method for sharing a load for executing a plurality of kinds of work processes among said plurality of computers in said computer group, said method comprising the steps of:

setting a resource utilization target value by each work for each of said plurality of computers included in said computer group in said operation management mechanism;

collecting a parameter value indicative of a resource utilization state, corresponding to each work, for each of said plurality of computers included in said computer group into said operation management mechanism;

selecting one computer to execute a newly requested work process from said plurality of computers included in said computer group on the basis of the differences between resource utilization target parameter values by respective works in said plurality of computers included in said computer group and parameters values indicating current resource utilization states corresponding to the respective works from said operation management mechanism; and executing, in the selected computer, the newly requested work process.

2. A load sharing control method according to claim 1, wherein said parameter value indicating the resource utilization state corresponding to each work of said plurality of computers included in said computer group collected by said operation management mechanism includes at least one of CPU utilization ratio information for each of said computers included in said computer group, CPU utilization ratio information weighted by difference in performance of said plurality of computers included in said computer group, and main storage available-state information in said plurality of computers included in said computer group.

3. A load sharing control method according to claim 1, wherein the step of selecting a computer to execute a newly requested work process includes a substep of calculating a difference between a resource utilization target parameter value corresponding to each work in each of said computers included in said computer group and the collected resource utilization state parameter corresponding to each work to thereby select a computer of which said difference is largest.

4. A load sharing control method according to claim 1, wherein said operation management mechanism includes a high-connection facility.

5. A load sharing control method according to claim 1, wherein said plurality of kinds of work processes includes at least two of an online process, a batch process and a time-sharing system process.

6. In a parallel computer system having a computer group including a plurality of computers and an operation management mechanism which is a computer for managing the operation of the computer group, a load sharing control apparatus for sharing a load for executing a plurality of kinds of work processes to said plurality of computers in said computer group comprises:

means provided in said operation management mechanism for setting a resource utilization target value corresponding to each work for each of said plurality of computers included in said computer group;

means provided in said operation management mechanism for collecting a parameter value indicative of resource utilization state corresponding to each work for each of said plurality of computers included in said computer group into said operation management mechanism;

means provided in each of said plurality of computers included in said computer group for selecting one computer to execute a newly requested work process from said plurality of computers included in said computer group on the basis of the differences between resource utilization target parameter values by respective works in said plurality of computers included in said computer group and current values of a parameter values indicating current resource utilization states by the respective works from said operation management mechanism; and means for executing, in the selected computer, the newly requested work process.

7. A load sharing control apparatus according to claim 6, wherein said parameter value indicating the resource utilization state corresponding to each work of said plurality of computers included in said computer group collected by said operation management mechanism includes at least one of CPU utilization ratio information for each of said computers included in said computer group, CPU utilization ratio information weighted by difference in performance of said plurality of computers included in said computer group, and main storage available-state information in said plurality of computers included in said computer group.

8. A load sharing control apparatus according to claim 6, wherein said means for selecting a computer to execute a newly requested work process includes means for calculating a difference between a resource utilization target parameter value corresponding to each work in each of said computers included in said computer group and the informed resource utilization state parameter corresponding to each work to thereby select a computer of which said difference is largest.

9. A load sharing control apparatus according to claim 6, wherein said plurality of kinds of work processes includes at least two of an online process, a batch process and a time-sharing system process.

10. In a parallel computer system having a computer group including a plurality of computers and a shared storage unit for dynamically storing resource load information of the computer group which includes a computer for managing the operation of the computer group, a load sharing control method for sharing a load for executing a plurality of kinds of work processes among said plurality of computers in said computer group, said method comprising the steps of:

setting a resource utilization target value by each work for each of said plurality of computers included in said computer group in said operation management mechanism;

collecting a parameter value indicative of resource utilization states, corresponding to each work, for each of said plurality of computers included in said computer group into said operation management mechanism;

selecting one computer to execute a newly requested work process from said plurality of computers included in said computer group on the basis of the differences between resource utilization target parameter values by respective works in said plurality of computers included in said computer group and parameters values indicating current resource utilization states corresponding to the respective works from said operation management mechanism; and executing, in the selected computer, the newly requested work process.

11. In a parallel computer system having a computer group including a plurality of computers and a shared storage unit for dynamically storing resource load information of the computer group which is a computer for managing the operation of the computer group, a load sharing control apparatus for sharing a load for executing a plurality of kinds of work processes to said plurality of computers in said computer group comprises:

means provided in said operation management mechanism for setting a resource utilization target value corresponding to each work for each of said plurality of computers included in said computer group;

means provided in said operation management mechanism for collecting a parameter value indicative of resource utilization state corresponding to each work for each of said plurality of computers included in said computer group into said operation management mechanism;

means provided in each of said plurality of computers included in said computer group for selecting one computer to execute a newly requested work process from said plurality of computers included in said computer group on the basis of the differences between resource utilization target parameter values by respective works in said plurality of computers included in said computer group and current values of a parameter values indicating current resource utilization states by the respective works from said operation management mechanism; and means for executing, in the selected computer, the newly requested work process.

* * * * *